April 11, 1933. F. KOCH 1,903,627
FISH ELEVATOR
Filed Sept. 1, 1932 3 Sheets-Sheet 3

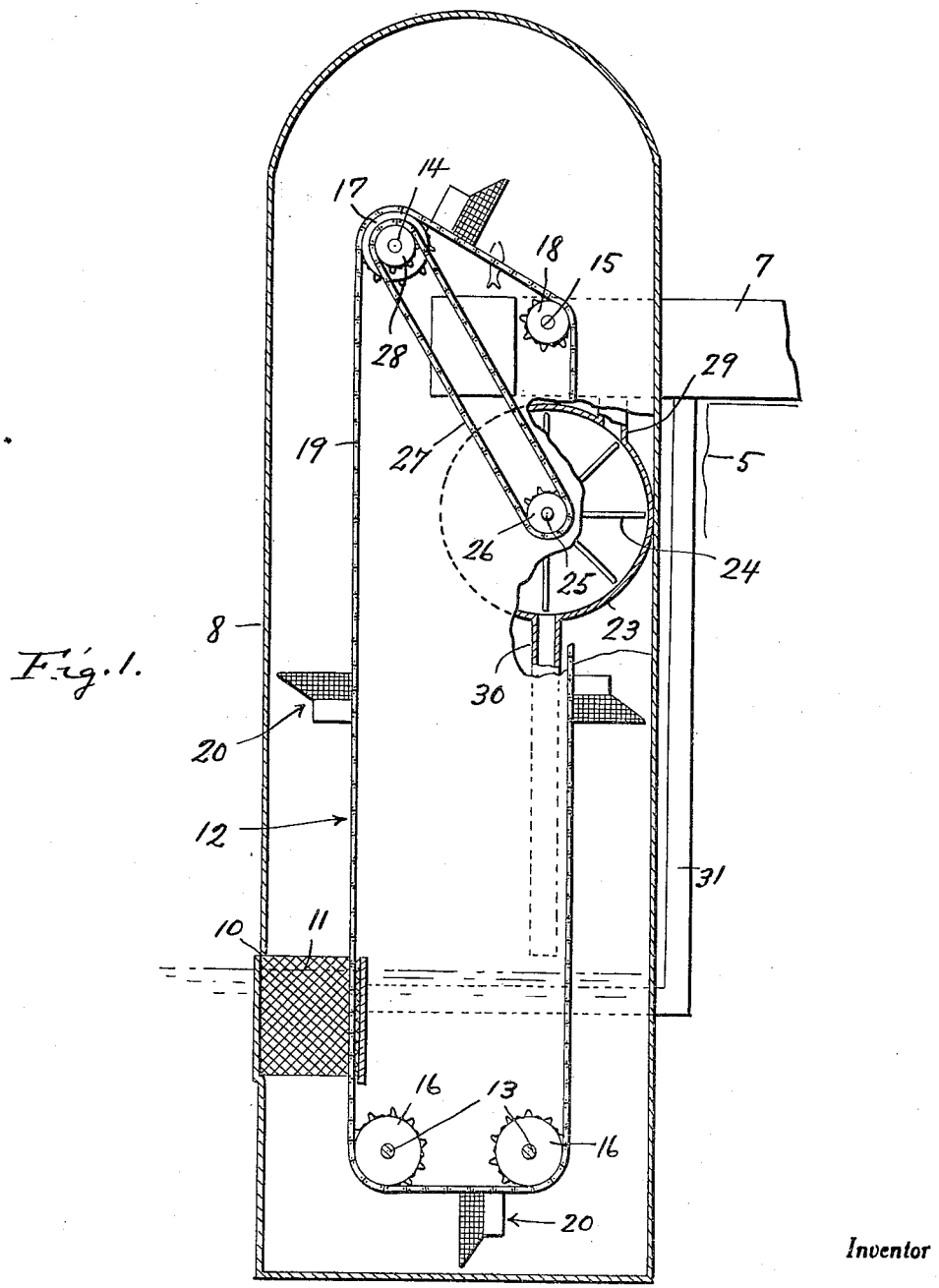

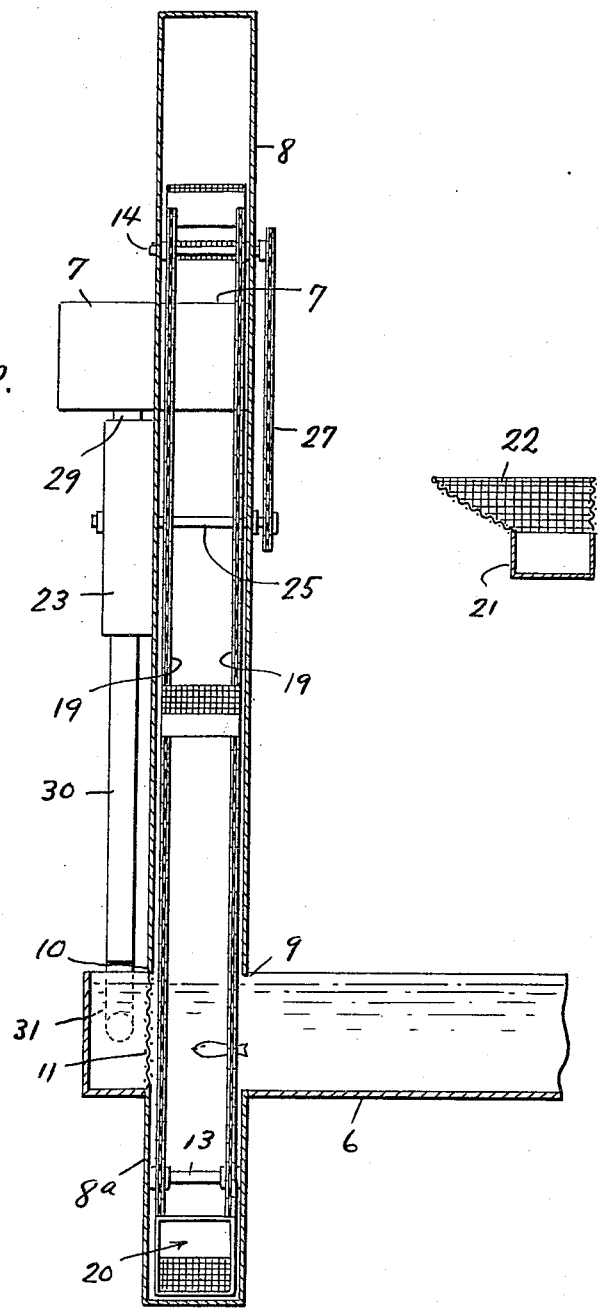

Inventor
Frank Koch
By Clarence A O'Brien
Attorney

Patented Apr. 11, 1933

1,903,627

UNITED STATES PATENT OFFICE

FRANK KOCH, OF SEBEWAING, MICHIGAN

FISH ELEVATOR

Application filed September 1, 1932. Serial No. 631,418.

This invention relates to improvements in elevators employed for lifting fish from lower to higher levels of rivers and creeks, and the prime object of the invention is to simplify and improve upon the types of elevator now generally employed for this purpose.

In accordance with the present invention an elevator of the above mentioned character is provided, that is simple in construction, consists of relatively few parts, may be readily and easily installed, and maintained at a nominal cost.

The invention together with its numerous objects and advantages will be best understood from a study of the following description taken in connection with the accompanying drawings, wherein:—

Figure 1 is a longitudinal sectional elevational view of the elevator.

Figure 2 is a view taken at right angles to Figure 1.

Figure 3 is a sectional view through a combined basket and bucket.

Figure 4:
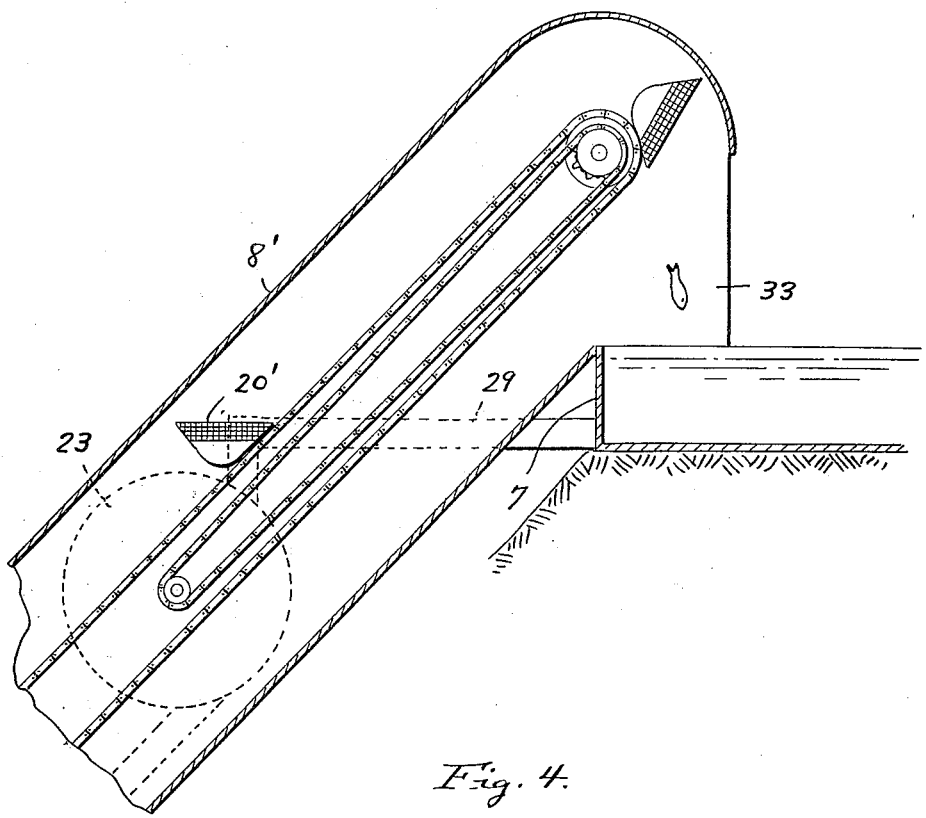
Figure 4 is a fragmentary sectional elevational view through a slightly modified form of the invention.

With reference more in detail to the drawings it will be seen that 5 designates generally a barrier or dam on the opposite sides of which, and as it is well known, the water is at different levels.

In accordance with my invention a trough 6 is arranged in the lower level of the body of the water and forms a pond for the fish. At the top of the embankment is provided a second trough or pond 7, and for transferring the fish from the lower pond or trough 6 to the upper pond or trough 7 I provide an elevator which comprises a casing 8, which in the present instance is extended downwardly below the bottom of the pond 6 as at 8a. The casing 8 and its extension may be made of metal, wood or any other suitable material. Adjacent the extension 8a the casing opens into the pond 6 through the medium of lateral openings 9 and 10. Disposed over the opening 10 nearest to the approximate end wall of the pond 6 is a screen 11 for a purpose hereinafter made manifest.

The upper trough 7 at its forward end is extended laterally into the casing 8 to extend transversely of the casing as suggested in Figure 2. A conveyor 12 is arranged within the casing 8 and comprises a pair of spaced parallel lower shafts 13 journaled in the casing extension 8a and upper shafts 14, 15 supported between the side walls of the casing 8 adjacent the upper end thereof, and in this connection it will be noted that the shaft 14 is disposed in a plane above shaft 15, the latter being substantially in the plane of the trough 7. Fixed to the shafts 13 are sprocket wheels 16 while fixed to the shaft 14 are sprocket wheels 17, and smaller sprocket wheels 18 are fixed to the shaft 15. Trained over the sprocket wheels 16, 17 and 18 are sprocket chains 19 and supported between the chains 19 at spaced intervals are receptacles 20. Each receptacle 20 comprises a pan-like bottom portion 21 of metal or other suitable imperforate material, and an upper wall portion 22 of screening or other reticulated material. The receptacles 20 are preferably of the shape shown.

Disposed laterally of the casing 8, is a casing 23, and this casing 23 is circular and has arranged therein a water wheel 24. Water wheel 24 is fixed on one end of a shaft 25, and an end portion of the shaft 25 extends transversely through the casing 8 and exteriorly of the casing is provided with a sprocket 26. Drive from the shaft 25 is transmitted to the shaft 14 of the elevator through the medium of a sprocket chain 27 trained over the sprocket 26 and a sprocket 28 provided on one end of the shaft 14.

The casing 23 is connected with the trough 7 through the medium of a tubular inlet neck 29 extending from the peripheral wall of the casing 23 and connected with the bottom of the trough 7 whereby provision is made for conveying water from the trough 7 into the casing 23 in such a manner that the water will impinge upon the blades of the wheel 24 for rotating the same and thereby drive the elevator or conveyor 12 in a manner thought apparent. A pipe 29 leads from the casing 23 to the trough 6 and spills into the trough 6 between the screen 11 and the adjacent end wall of the trough as shown in Figure 2.

For conducting water from the upper to the lower level of the stream or creek there is provided a pipe 31 that extends downwardly from the trough 7 and at its lower end has a horizontal portion extending transversely through the trough 6 between one end wall of the trough and an adjacent side of the casing 8 as will be clear from a study of Figures 1 and 2.

From the description of the invention thus far it will be seen that the fish advance toward the screen 11 which serves as a barrier and thus the fish will be directed into the part of the receptacles 20. The receptacles will pick up the fish from the trough 6 and discharge them into the lateral extension of the trough 7, and through the medium of the trough 7 they are directed into the water beyond the barrier or dam 5.

If desired, instead of having the elevator in a vertical position as shown in Figures 1 and 2, the same will also function admirably for its intended purpose by being disposed at an incline as suggested in Figure 4. In this form of the invention the lateral extension of the trough 7 may be dispensed with, and the casing 8′ at its upper end is provided with an extension 33 forming an opened neck disposed vertically with respect to the trough 7. Other minor re-arrangements of parts will, of course, be necessary, as for example the pipe 29′ will be extended horizontally from the forward end of the trough 7 in order to form a passageway between the trough and the casing 23, and I have also found it desirable to use a receptacle 20′ of the shape shown in Figure 4 instead of the receptacle of the shape as suggested in Figure 3. It may be also noted with reference to the elevator, that when the same is disposed at an incline, pairs of upper and lower shafts may be dispensed with as a single shaft at the top and bottom of the elevator will admirably serve the purpose.

Even though I have herein shown and described the preferred embodiments of the invention it is to be understood that I do not wish to limit myself to the precise construction and arrangement of elements as herein shown but claim all such forms of the invention to which I am entitled.

Having thus described my invention, what I claim as new is:—

1. In a fish elevator of the class described, a casing, an endless elevator operating within said casing, and including spaced receptacles, and means for driving said elevator comprising a casing disposed laterally in the first named casing, a water wheel arranged in the second named casing, driving connection between said water wheel and said elevator, and means for directing water through the second named casing for rotating said water wheel.

2. A device for carrying fish over a barrier or dam comprising a trough located below the top of the barrier, a casing extending upwardly from the trough to the top of the barrier, said casing being provided with a lateral opening adjacent its lower end whereby provision is made for the passage of fish from said trough into said casing, elevator means operating within said casing, and means for driving said elevator means, said elevator driving tubular means including means forming a passage for conducting water from the high water level side of said barrier to the low water level side thereof, a circular casing intermediate the ends of said tubular passage, and a water wheel arranged in said circular casing in the path of the flow of water, and having driving connections with said elevator.

3. In a device of the character described, the combination of a barrier, a trough disposed adjacent the bottom of the barrier, a second trough disposed at the top of the barrier, and an elevator casing extending from the first to the second named trough, and provided adjacent its lower end with oppositely disposed lateral openings communicating the casing with the lower trough, a screen closing one of said openings, an endless elevator including spaced buckets operating within said casing, a casing disposed laterally of the elevator casing, a water wheel arranged in said lateral casing, and motion transmitting means connecting said water wheel with said elevator for driving the latter.

In testimony whereof I affix my signature.

FRANK KOCH.